United States Patent [19]

Chida

[11] Patent Number: 5,067,066

[45] Date of Patent: Nov. 19, 1991

[54] VOLTAGE-MODE QUASI-RESONANT DC/DC CONVERTER

[75] Inventor: Jun Chida, Yokohama, Japan

[73] Assignee: Fujitsu Limited, Kawasaki, Japan

[21] Appl. No.: 651,518

[22] Filed: Feb. 6, 1991

[30] Foreign Application Priority Data

Feb. 6, 1990 [JP] Japan .................................. 2-025062

[51] Int. Cl.[5] .......................................... H02M 3/335
[52] U.S. Cl. .......................................... 363/16; 363/97;
323/222; 323/225; 323/271; 323/282
[58] Field of Search ............... 323/222, 223, 225, 268,
323/271, 282, 284; 363/16, 97

[56] References Cited

U.S. PATENT DOCUMENTS

| | | | |
|---|---|---|---|
| 4,720,667 | 1/1988 | Lee et al. | 323/271 |
| 4,720,668 | 1/1988 | Lee et al. | 323/271 |
| 4,841,220 | 6/1989 | Tabisz et al. | 363/16 |
| 4,857,822 | 8/1989 | Tabisz et al. | 323/282 |
| 4,866,367 | 9/1989 | Ridley et al. | 323/287 |
| 4,891,746 | 1/1990 | Bowman et al. | 363/97 |
| 4,931,716 | 6/1990 | Jovanovic et al. | 323/271 |
| 4,959,764 | 9/1990 | Bassett | 323/222 |

OTHER PUBLICATIONS

Liu et al.; "Zero Voltage Switching Technique in DC/DC Converters"; PESC Records, 1986 (Dec.), pp. 58 ∫ 70.

Primary Examiner—Steven L. Stephan
Assistant Examiner—Jeffrey Sterrett
Attorney, Agent, or Firm—Staas & Halsey

[57] ABSTRACT

A voltage-mode quasi-resonant dc/dc converter which operates in full-wave mode at high switching frequencies is disclosed. The ideal switch for the voltage-mode quasi-resonant converter is implemented by a pair of MOSFET switches serially connected to each other so that their parasitic diodes are opposite to each other. This construction enables a charge on the parasitic capacitances of the MOSFETs to be released, and heat loss to be reduced, so that a full-wave mode operation at high switching frequencies can be realized.

13 Claims, 11 Drawing Sheets

VOLTAGE-MODE QUASI-RESONANT DC/DC CONVERTER

BACKGROUND OF THE INVENTION

1. Field of the Invention

The present invention relates to a voltage-mode quasi-resonant dc/dc converter which performs frequency control and zero-voltage switching in a full-wave mode.

2. Description of the Related Art

The voltage-mode quasi-resonant dc/dc converter is expected to operate at high switching frequencies such as more than several megahertz, since switching stress and switching loss are relatively low in zero-voltage switching which the converter can perform.

The voltage-mode quasi-resonant converter comprises a resonant switch, in principle, consisting of a resonant inductor, a resonant capacitor, and an ideal switch which is parallel to the resonant capacitor. If the switch is implemented by a transistor and a reverse-parallel diode, the converter operates in a half-wave mode, where voltage oscillation across the resonant capacitor during off-time of the switch is unipolar. On the other hand, if the switch is implemented by a transistor with a series diode, the converter operates in a full-wave mode, where voltage oscillation across the resonant capacitor during off-time of the switch is bipolar.

It is known that a more desirable voltage-conversion ratio which is insensitive to load variations is obtained in the full-wave mode. However, in the full-wave mode implementation, the series diode is required to provide a reverse-voltage blocking capability. Consequently, energy stored in a parasitic capacitance of the transistor is trapped by the series diode during off-time and is dissipated internally after the switch turns on. Therefore, the full-wave mode has not been practical for high-frequency operation.

SUMMARY OF THE INVENTION

It is an object of the present invention to provide a voltage-mode quasi-resonant dc/dc converter which operates in full-wave mode at high switching frequencies.

In accordance with the present invention, there is provided a voltage-mode quasi-resonant converter comprising a resonant inductor, a resonant capacitance connected in series to the resonant inductor, a switching circuit connected in parallel to the resonant capacitor, a DC power source, an input inductor which stores current energy from the DC power source during on-time of the switching circuit and supplies stored current energy to the resonating resonant capacitor and the resonant inductor during off-time of the switching circuit, and a diode which supplies DC power from the resonating resonant capacitor and the resonant inductor to a load, wherein the switching circuit comprises a pair of MOSFET switches serially connected to each other so that their parasitic diodes are opposite to each other.

It is preferable that the pair of MOSFET switches are simultaneously turned on and turned off.

Alternatively, it is also preferable that the pair of MOSFET switches are controlled so that one of the MOSFET switches does not conduct during a period where voltage across the resonant capacitance is positive and another MOSFET switch does not conduct during a period where voltage across the resonant capacitance is negative.

DESCRIPTION OF THE PREFERRED EMBODIMENTS

Before describing the preferred embodiments according to the invention, examples of aforementioned related art are given with reference to the accompanying drawings.

Figure 1:
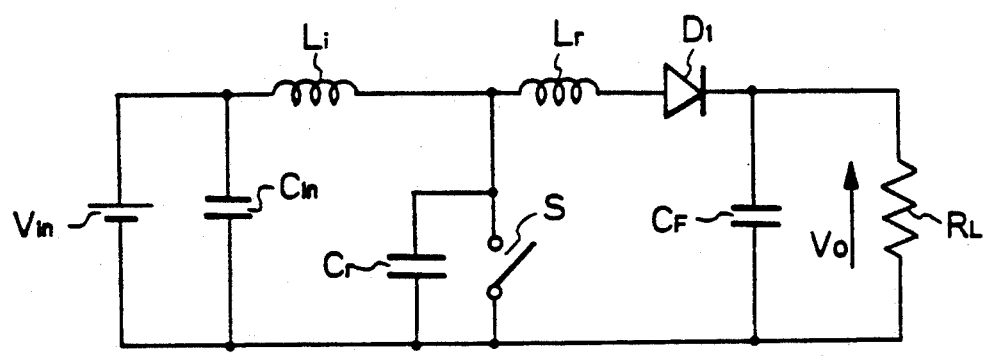
FIG. 1 is a basic circuit diagram of a voltage-mode quasi-resonant boost converter.

FIG. 1 is a basic circuit diagram of a voltage-mode quasi-resonant boost converter.

An input inductor $L_i$ stores current energy from an input power source $V_{in}$ and an input capacitance $C_{in}$ during on-time of an ideal switch S. During off time of the ideal switch S, constant current from the input inductor $L_i$ is supplied to a resonant capacitor $C_r$ before a diode $D_1$ turns on, and is supplied to resonating resonant capacitor $C_r$ and resonant inductor $L_r$ after the diode $D_1$ turns on. Current flowing through the resonant inductor $L_r$ and the diode $D_1$ is supplied to a load $R_L$ and a smoothing capacitor $C_F$.

A duration of the off-time is settled to a constant value so as to perform zero voltage switching of the ideal switch. On the other hand, a duration of the on-time is controlled so that the output voltage $V_0$ becomes equal to a desired value.

Figure 2:
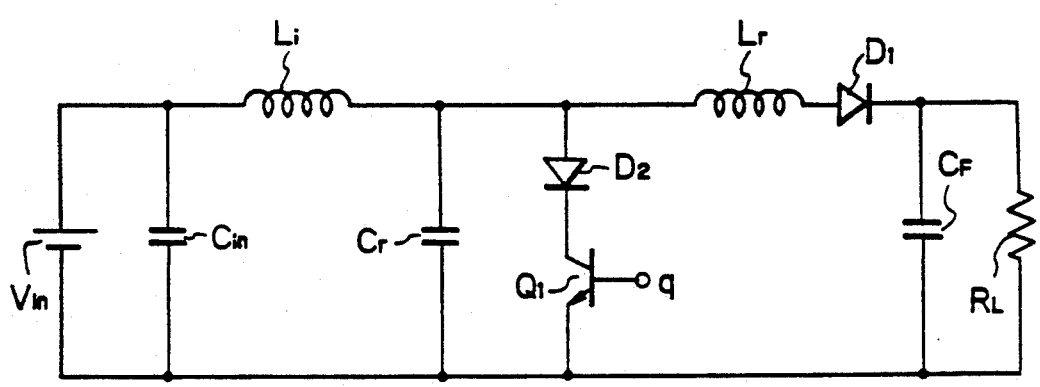
FIG. 2 is a circuit diagram of a voltage-mode quasi-resonant boost converter wherein an ideal switch is implemented by a bipolar transistor.

FIG. 2 is a circuit diagram of a voltage-mode quasi-resonant boost converter, wherein the ideal switch S is implemented by a bipolar transistor $Q_1$ and a reverse blocking diode $D_2$ in series with the transistor $Q_1$. The reverse blocking diode $D_2$ is provided to protect the transistor $Q_1$ from breakdown by a reverse voltage applied in the off-time.

The converter shown in FIG. 2 can operate in full-wave mode owing to the reverse blocking diode $D_2$.

Figure 3:
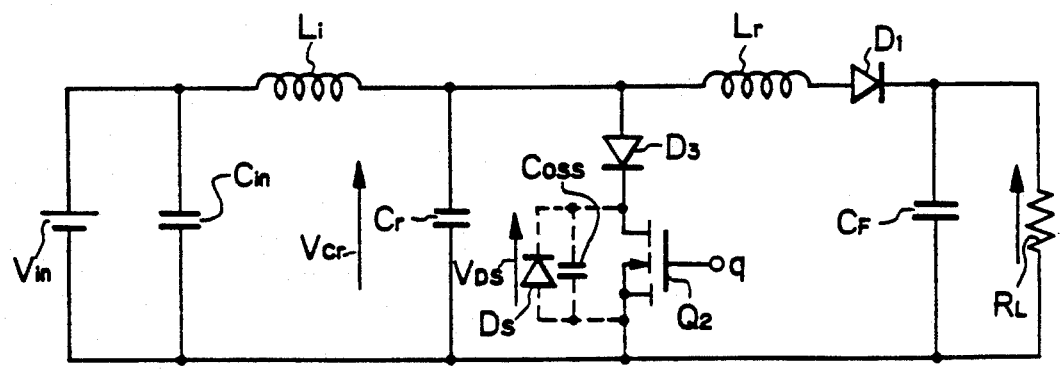
FIG. 3 is a circuit diagram of a voltage-mode quasi-resonant boost converter wherein an ideal switch is implemented by a MOSFET.

FIG. 3 is a circuit diagram of another example of the voltage-mode quasi-resonant boost converter, wherein the ideal switch S is implemented by a MOSFET $Q_2$ and a reverse blocking diode $D_3$. The reverse blocking diode $D_3$ is provided to prevent the MOSFET $Q_2$ from conducting through a parasitic diode $D_s$ of the MOSFET $Q_2$. If the reverse blocking diode $D_3$ was absent, the converter could operate only in half-wave mode, because the voltage $V_{cr}$ across the resonant capacitor $C_r$ is clamped to a minimum value by the parasitic diode $D_s$. In the half-wave mode, the voltage-conversion ratio $V_0/V_{in}$ becomes undesirably sensitive to variations in the load $R_L$.

As mentioned above, the converter shown in FIG. 3 can also operate in full-wave mode owing to the reverse blocking diode $D_3$. However, the converters shown in FIGS. 2 and 3 cannot operate at high switching frequencies in the full-wave mode because of large internal heat loss due to a parasitic capacitance in the transistor and the reverse blocking diode as explained below.

Figure 4A:
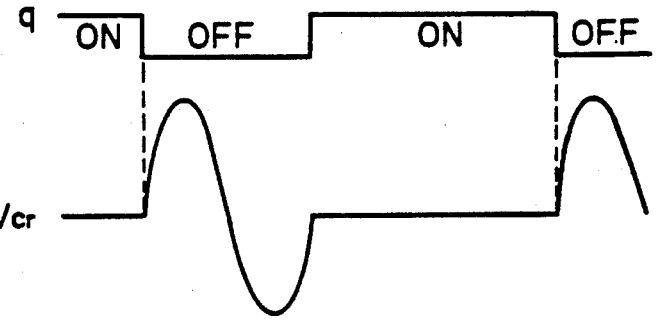
FIGS. 4A, 4B and 4C are waveform diagrams showing waveforms in a conventional converter operating in full-wave mode.
Figure 4B:
Figure 4C:
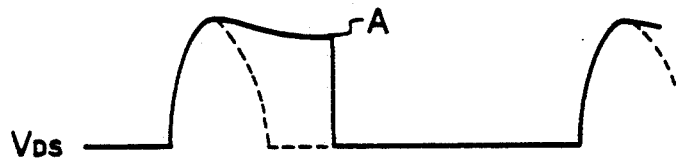

FIGS. 4A, 4B and 4C show waveforms of a driving signal q of the MOSFET $Q_2$, voltage $V_{cr}$ across the resonant capacitor $C_r$, and voltage $V_{ds}$ between drain and source terminals of the MOSFET $Q_2$ of FIG. 3, respectively.

As shown in FIG. 4B, voltage $V_{cr}$ across the resonant capacitance $C_r$ becomes positive and then becomes negative. The parasitic capacitance $C_{oss}$ of the MOSFET $Q_2$ is charged up to a positive peak value of the $V_{cr}$, and a discharge of the parasitic capacitance is prevented by the diode $D_3$. When the MOSFET $Q_2$ turns on, energy corresponding to $V_{DS}$ denoted by A in FIG. 4C is internally dissipated and this leads to heat loss.

The amount of heat loss is increased as the switching frequency becomes higher. This situation also occurs in the converter shown in FIG. 2 due to a parasitic capacitance in the transistor $Q_1$ and the diode $D_2$. Therefore, the full-wave mode has not been practical for high-frequency operation, hitherto.

The preferred embodiment of the present invention will now be described with reference to the accompanying drawings.

Figure 5:
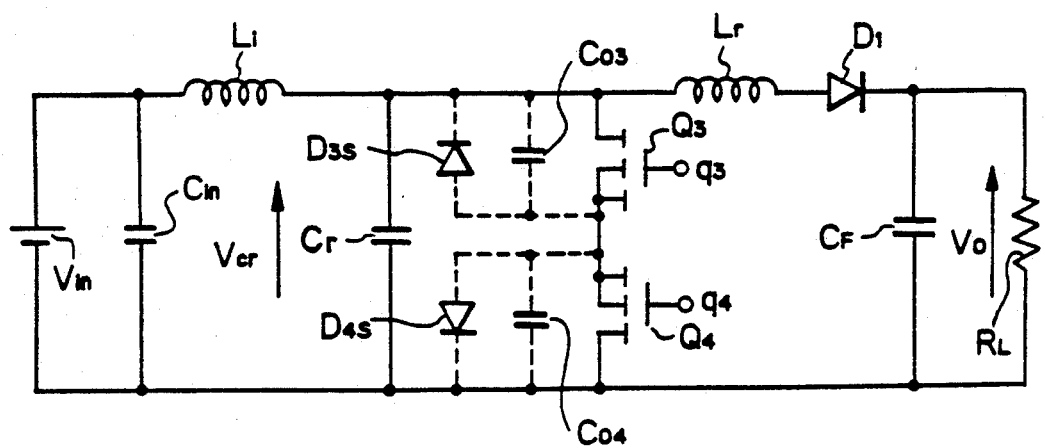
FIG. 5 is a circuit diagram of a voltage-mode quasi-resonant boost converter, according to the first embodiment of the present invention.
Figure 6:
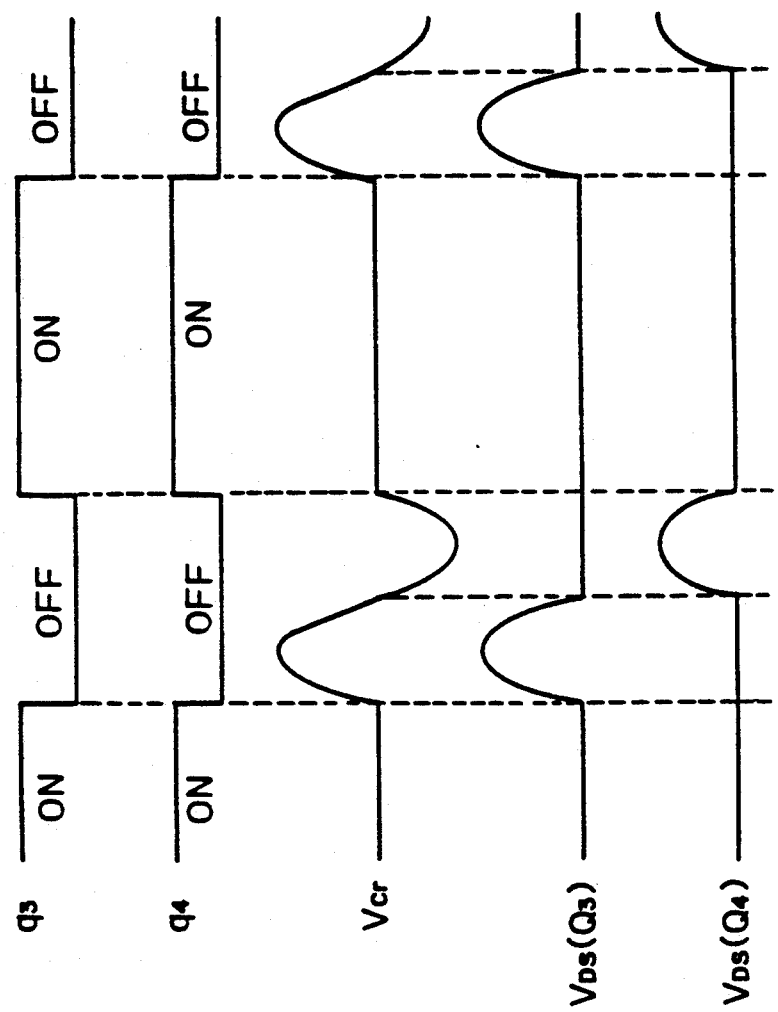
FIGS. 6A, 6B, 6C, 6D and 6E showing waveforms in the converter shown in FIG. 5.

FIG. 5 is a circuit diagram of a voltage-mode quasi-resonant boost converter according to a first embodiment of the present invention.

The ideal switch S is implemented by a pair of MOSFETs $Q_3$ and $Q_4$ serially connected to each other so that their parasitic diodes $D_{3s}$ and $D_{4s}$ are opposite to each other. The MOSFETs $Q_3$ and $Q_4$ are simultaneously turned on and off at an on-time and off-time of the converter, respectively, according to drive signals $q_3$ and $q_4$.

FIGS. 6A, 6B, 6C, 6D, and 6E show waveforms of the drive signals $q_3$ and $q_4$, voltage $V_{cr}$ across the resonant capacitance $C_r$, drain-source voltage $V_{DS}$ of the MOSFET $Q_3$, and drain-source voltage $V_{DS}$ of the MOSFET $Q_4$, respectively.

While the voltage $V_{cr}$ is positive, the parasitic diode $D_{4s}$ of the MOSFET $Q_4$ conducts, so that the parasitic capacitance $C_{04}$ of the MOSFET $Q_4$ is not charged and energy stored in the parasitic capacitance $C_{03}$ of the MOSFET $Q_3$ does not remain until the end of a period where the $V_{cr}$ is positive. While the voltage $V_{cr}$ is negative, the parasitic diode $D_{3s}$ of the MOSFET $Q_3$ conducts, so that the parasitic capacitance $C_{03}$ of the MOSFET $Q_3$ is not charged and energy stored in the parasitic capacitance $C_{04}$ of the MOSFET $Q_4$ does not remain until the end of a period where the voltage $V_{cr}$ is negative.

Consequently, when the MOSFETs $Q_3$ and $Q_4$ turn on, energy remains in neither capacitance $C_{03}$ nor $C_{04}$. Therefore, internal dissipation of energy is avoided.

Figure 7:
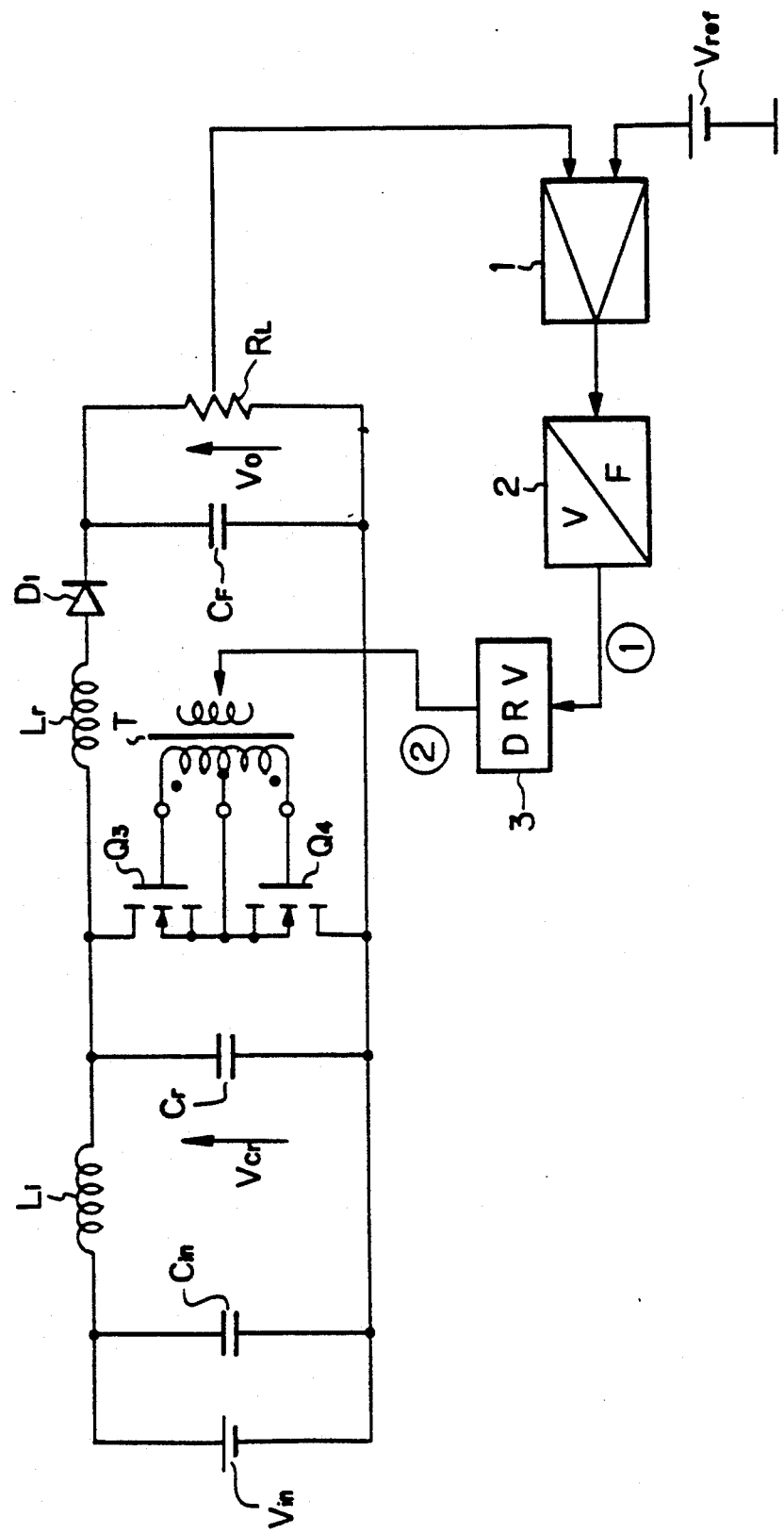
FIG. 7 is a circuit diagram of a voltage-mode quasi-resonant boost converter including a control circuit for an output voltage, according to the first embodiment of the present invention.

FIG. 7 is a circuit diagram of the voltage-mode quasi-resonant boost converter as shown in FIG. 5, but including a control circuit of the MOSFETs $Q_3$ and $Q_4$.

An amplifier circuit 1 amplifies an error voltage between the output voltage $V_0$ or its division and reference voltage $V_{ref}$. An output of the amplifier circuit 1 is applied to a Voltage to Frequency (V/F) converter circuit 2 which outputs a clock signal having a frequency proportional to an input voltage. A driving circuit 3 generates a driving signal having a cycle period equal to that of the clock signal. A driving transformer T generates voltages in response to the driving signal to simultaneously turn on and off the MOSFETs $Q_3$ and $Q_4$, and insulates the MOSFETs $Q_3$ and $Q_4$ from the driving circuit 3. A photo-coupler can be used instead of the driving transformer T.

Figures 8A, 8B, 8C, 8D:
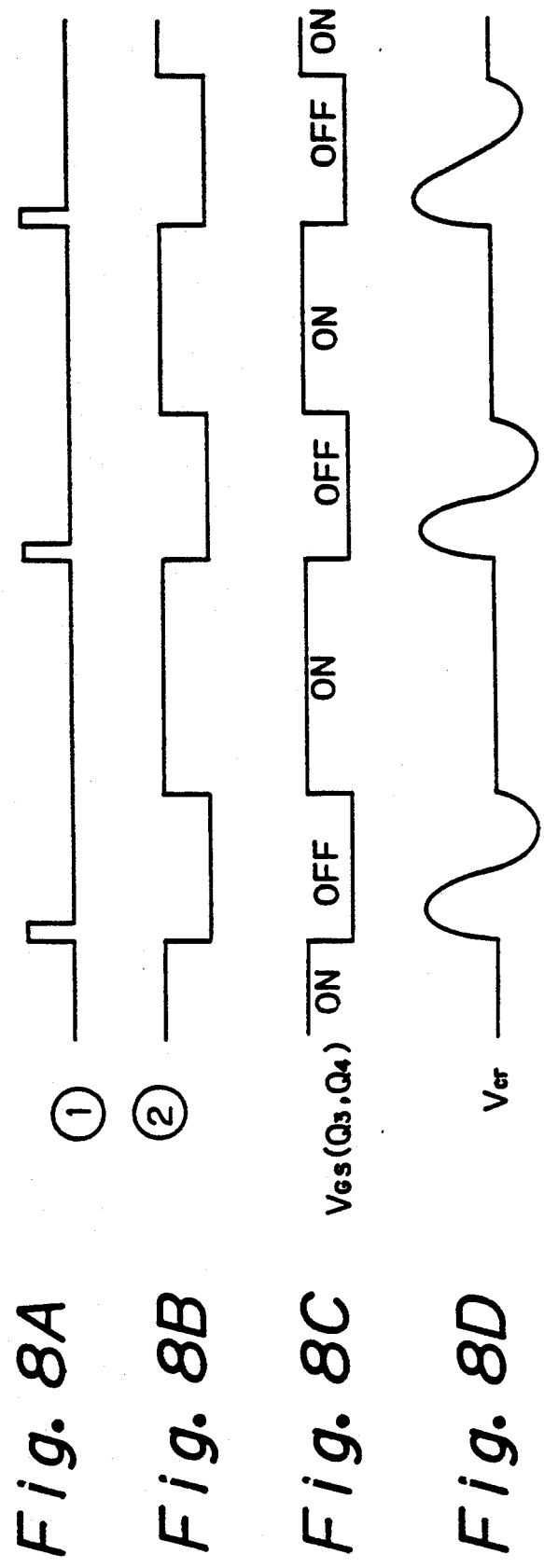
FIGS. 8A, 8B, 8C and 8D are waveform diagrams showing waveforms in the converter shown in FIG. 7.

FIGS. 8A, 8B, 8C, and 8D show waveforms of the clock signal, the driving signal, gate-source voltage of the MOSFET $Q_3$ or $Q_4$, and the voltage $V_{cr}$ across the resonant capacitance $C_r$, respectively. A duration of an interval of the driving signal where the MOSFET switches $Q_3$ and $Q_4$ are opened (FIGS. 8B and 8C) is constant. On the other hand, a duration of another interval of the driving signal where the MOSFET switches $Q_3$ and $Q_4$ are closed is varied with the cycle period of the clock signal (FIG. 8A), i.e., is varied depending on the difference between the output voltage $V_0$ and the reference voltage $V_{ref}$. Consequently, zero-voltage switching in full-wave mode is performed as shown in FIG. 8D, and the output voltage $V_0$ is controlled so as to be equal to $V_{ref}$, by controlling the length of the on-time.

Figure 9:
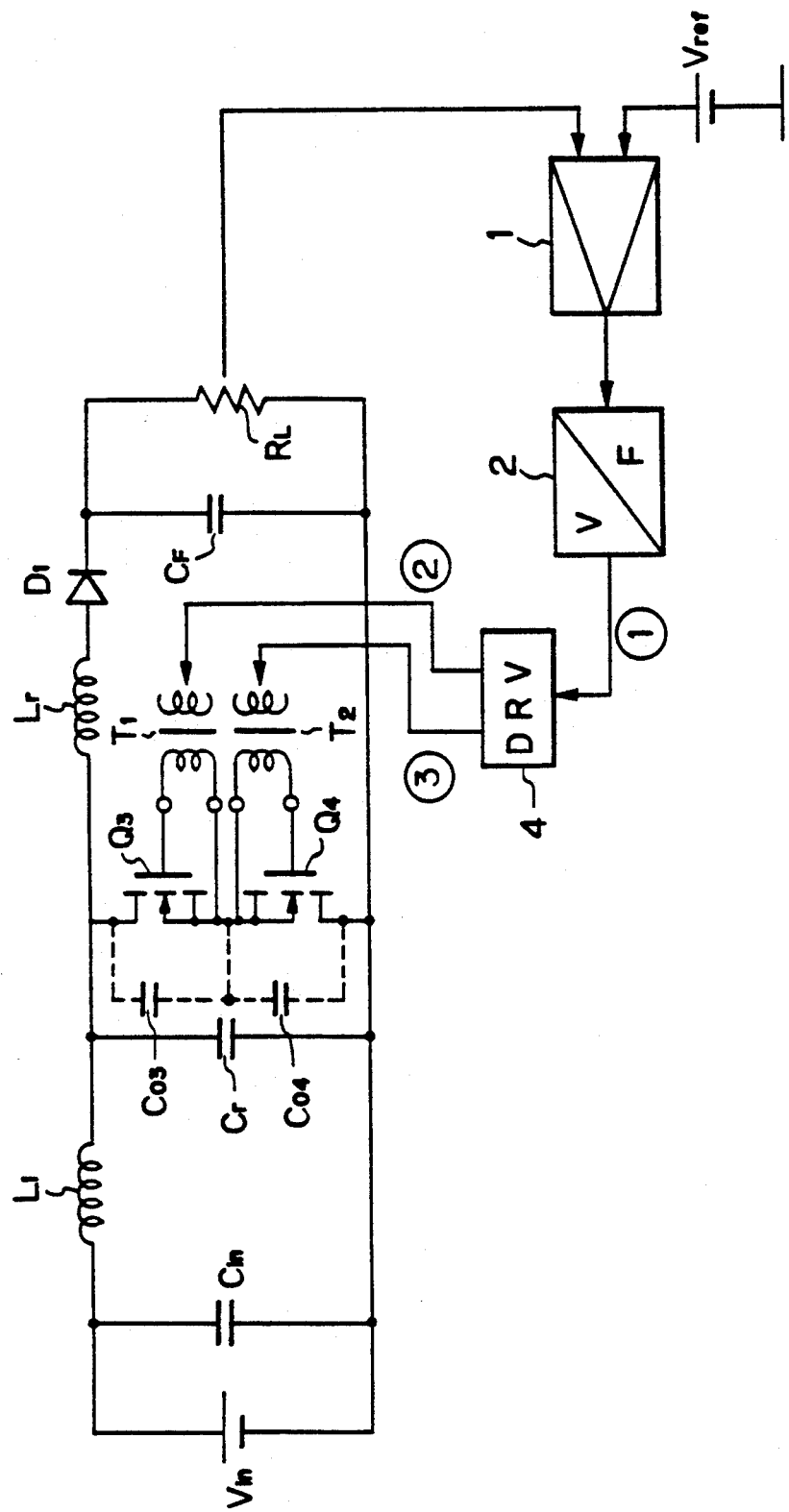
FIG. 9 is a circuit diagram of a voltage-mode quasi-resonant boost converter, according to the second embodiment of the present invention.

FIG. 9 is a circuit diagram of a voltage-mode quasi-resonant boost converter, according to a second embodiment of the present invention. The driving transformer T shown in FIG. 7 is replaced by two driving transformers $T_1$ and $T_2$, which are individually controlled by a driving circuit 4. Also, two photo-couplers can be used instead of the two driving transformers $T_1$ and $T_2$.

Figure 10:
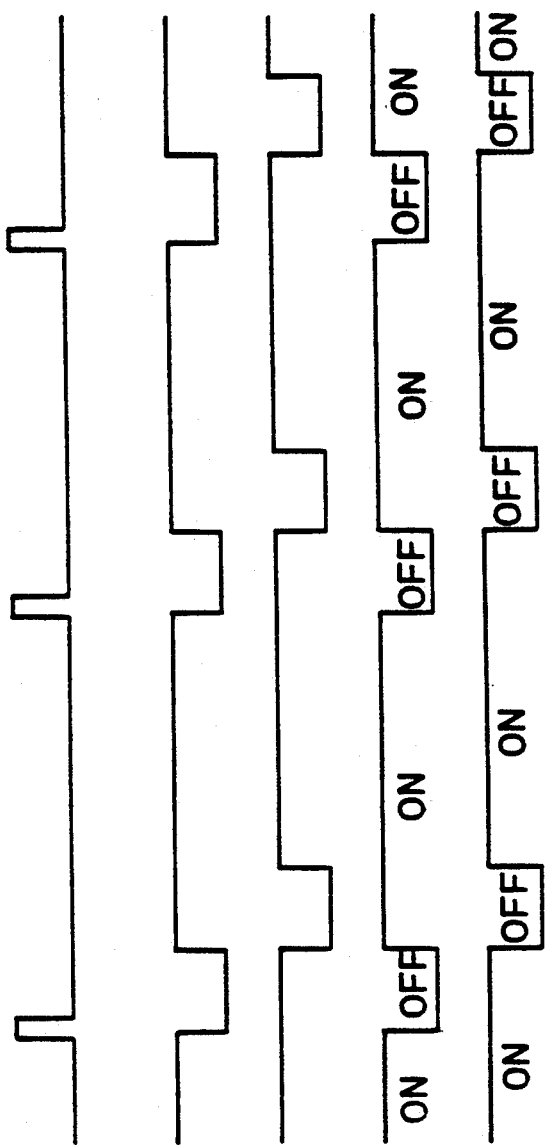
FIGS. 10A, 10B, 10C, 10D and 10E are waveform diagrams showing waveforms in the converter shown in FIG. 9.

FIGS. 10A, 10B, 10C, 10D, and 10E show waveforms of the clock signal generated in the V/F converter circuit 2, one driving signal generated in the driving circuit 4, another driving signal generated in the driving circuit 4, gate-source voltage of the MOSFET $Q_3$, and gate-source voltage of the MOSFET $Q_4$, respectively. As shown in FIGS. 10B and 10C, the driving circuit 4 generates the driving signals at different timing from each other in response to the clock signal (FIG. 10A), and thus the MOSFETs $Q_3$ and $Q_4$ are controlled at different timing from each other. Only the MOSFET $Q_3$ stops conducting during the period where the $V_{cr}$ becomes positive and only the MOSFET $Q_4$ stops conducting during the period where the $V_{cr}$ becomes negative. Therefore, energy stored in the parasitic capacitance $C_{03}$ and $C_{04}$ is discharged through the other conducting MOSFET $Q_4$ and $Q_3$, respectively, and the parasitic capacitance of conducting MOSFET is not charged. Thus, in the converter shown in FIG. 9 energy stored in parasitic capacitances is easily released.

Figure 11:
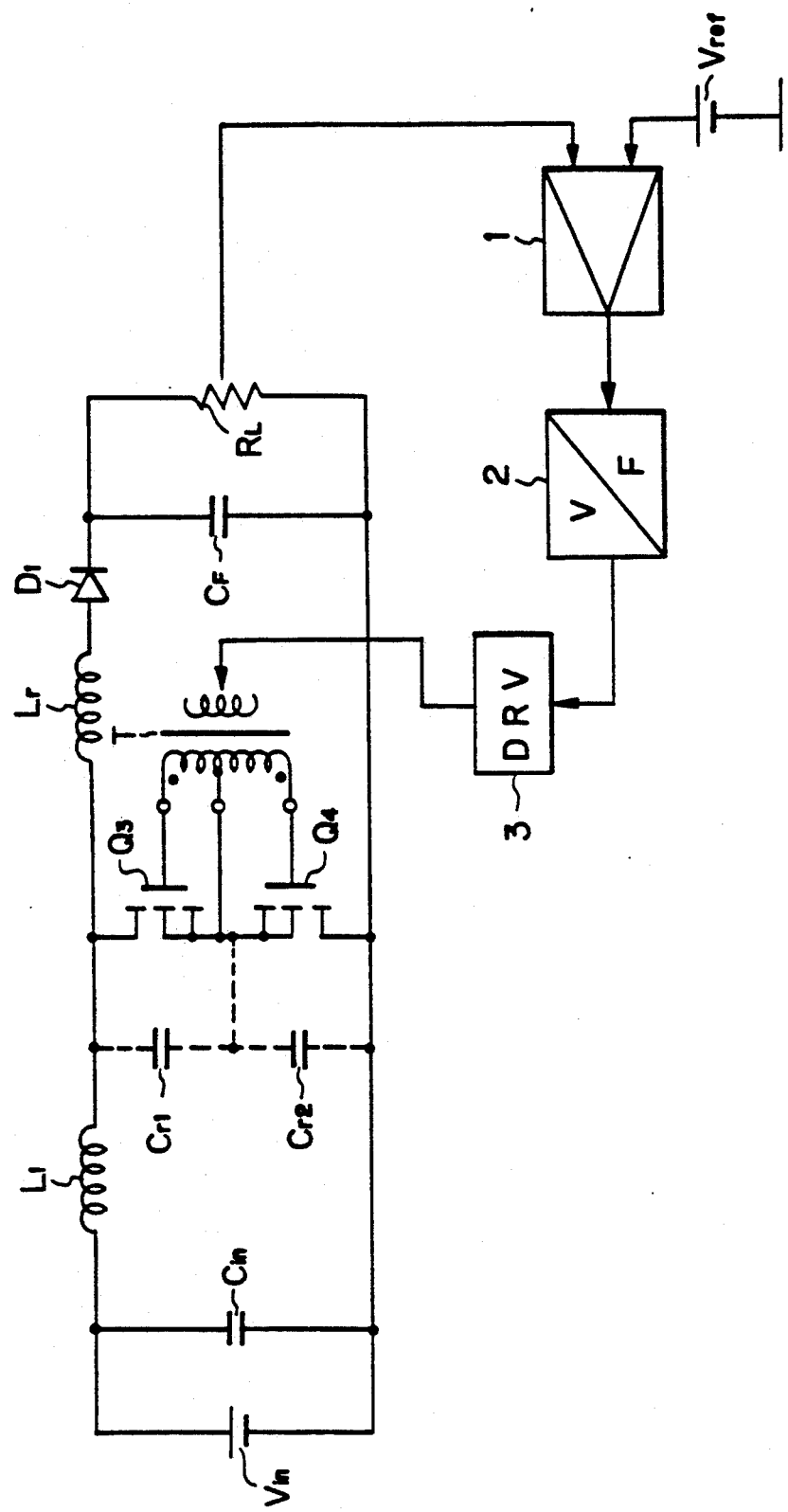
FIG. 11 is a circuit diagram of a voltage-mode quasi-resonant boost converter, according to the third embodiment of the present invention.

FIG. 11 is a circuit diagram of a voltage-mode quasi-resonant boost converter according to a third embodiment of the present invention. The resonant capacitance $C_r$ is implemented by two series capacitances $C_{r1}$ and $C_{r2}$ which are parasitic capacitances of the MOSFETs $Q_3$ and $Q_4$, respectively. This circuit construction is applicable if the resonance frequency is sufficiently high to utilize the parasitic capacitances as the resonance capacitance.

Figure 12:
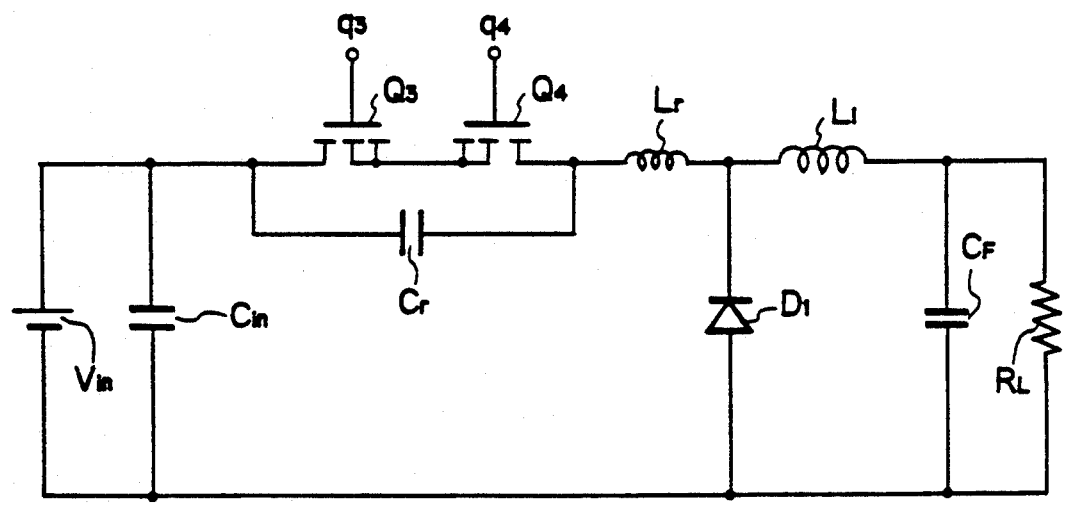
FIG. 12 is a circuit diagram of a voltage-mode quasi-resonant buck converter, according to the present invention.
Figure 13:
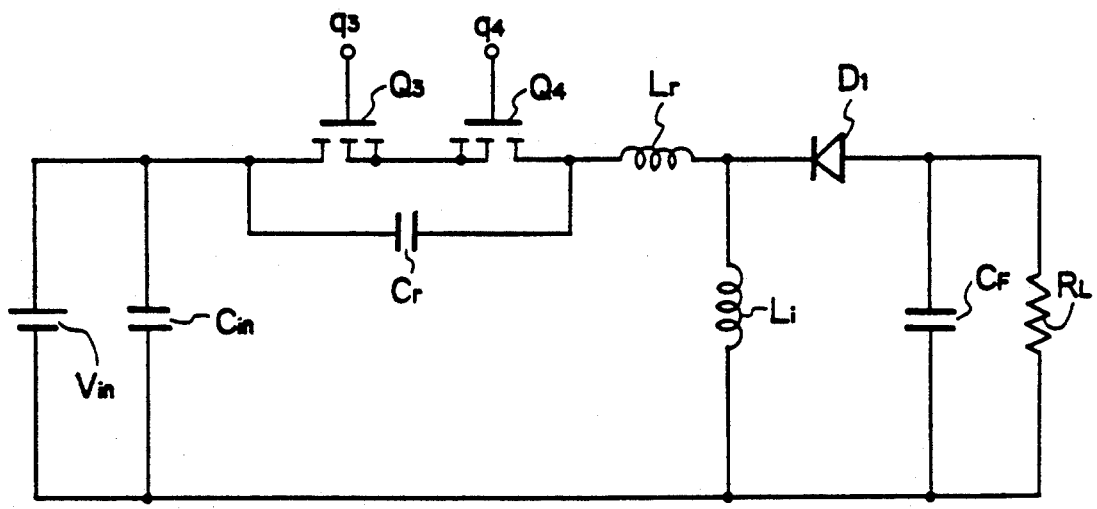
FIG. 13 is a circuit diagram of a voltage-mode quasi-resonant buck/boost converter, according to the present invention.

Though the above description is focused on a boost converter, the present invention may also be applied to a buck converter and a buck/boost converter. FIG. 12 is a circuit diagram of a voltage-mode quasi-resonant buck converter according to the present invention. FIG. 13 is a circuit diagram of a voltage-mode quasi-resonant buck/boost converter according to the present invention. The converters shown in FIGS. 12 and 13 can of course be modified according to the description with reference to FIGS. 7, 9 and 11.

I claim:

1. A voltage-mode quasi-resonant converter which supplies DC power to a load, comprising:
   a resonant inductor;
   a resonant capacitor connected in series with the resonant inductor;
   a switching circuit connected in parallel to the resonant capacitor:
   a DC power source coupled to the resonant capacitor:
   an input inductor coupled to the DC power source, which stores current energy from the DC power source during an on-time of the switching circuit and supplies stored current energy to the resonant capacitor and the resonant inductor during an off-time of the switching circuit; and
   a diode coupled to the DC power source, which supplies DC power from the resonant capacitor and the resonant inductor to the load, wherein said switching circuit comprises first and second MOSFET switches having respective first and second parasitic diodes, said first and second MOSFET switches being serially connected so that first and second anodes of respective first and second parasitic diodes are connected.

2. A voltage-mode quasi-resonant converter as claimed in claim 1, wherein said first and second MOSFET switches are simultaneously turned on and turned off.

3. A voltage-mode quasi-resonant converter as claimed in claim 1, wherein said first and second MOSFET switches are controlled so that one of said first and second MOSFET switches stops conducting during a period where a voltage across the resonant capacitor is positive and the other of said first and second MOSFET switches stops conducting during a period where the voltage across the resonant capacitor is negative.

4. A voltage-mode quasi-resonant converter as claimed in claim 1, wherein the resonant capacitor is a serial connection of first and second parasitic capacitances of the respective first and second MOSFET switches.

5. A voltage-mode quasi-resonant converter as claimed in claim 2, wherein said voltage-mode quasi-resonant converter is supplied with a reference voltage, further comprising:
   an amplifier circuit coupled to the load, for amplifying a difference voltage between a voltage supplied to the load and the reference voltage to provide an output voltage of the amplifier circuit;
   a voltage-to-frequency converter circuit coupled to the amplifier circuit, for outputting a clock signal having a frequency proportional to the output voltage of the amplifier circuit;
   a driving circuit coupled to the voltage-to-frequency converter circuit, for generating a driving signal having a cycle period equal to that of the clock signal; and
   insulating means for generating control voltage to control the first and second MOSFET switches in response to the driving signal and for insulating the first and second MOSFET switches from the driving circuit.

6. A voltage-mode quasi-resonant converter as claimed in claim 5, wherein the insulating means is a driving transformer.

7. A voltage-mode quasi-resonant converter as claimed in claim 3, wherein said voltage-mode quasi-resonant converter is supplied with a reference voltage, further comprising:
   an amplifier circuit coupled to the load, for amplifying a difference voltage between a voltage supplied to the load and a reference voltage to provide an output voltage of the amplifier circuit;
   a voltage-to-frequency converter circuit coupled to the amplifier circuit for outputting a clock signal having a frequency proportional to the output voltage of the amplifier circuit;
   a driving circuit coupled to the voltage-to-frequency converter circuit, for generating first and second driving signals having a cycle period equal to that of the clock signal, in order to individually control the first and second MOSFET switches; and
   first and second driving transformers coupled to the driving circuit, for generating respective first and second voltages to control the first and second MOS switches, respectively, in response to the first and second driving signals, respectively.

8. A voltage-mode quasi-resonant converter as claimed in claim 4, wherein said voltage-mode quasi-resonant converter is supplied with a reference voltage, further comprising:
   an amplifier circuit coupled to the load, for amplifying a difference voltage between a voltage supplied to the load and the reference voltage;
   a voltage-to-frequency converter circuit coupled to the amplifier circuit, for outputting a clock signal having a frequency proportional to the output voltage of the amplifier circuit;
   a driving circuit coupled to the voltage-to-frequency converter circuit, for generating a driving signal having a cycle period equal to that of the clock signal; and
   insulating means for generating a control voltage to control the first and second MOSFET switches in response to the driving signal and for insulating the first and second MOSFET switches from the driving circuit.

9. A voltage-mode quasi-resonant converter as claimed in claim 8, wherein the insulating means is a driving transformer.

10. An apparatus for use in a voltage-mode quasi-resonant converter, comprising:
    an inductor;

a first MOSFET switch connected in series with said inductor;

a second MOSFET switch connected in series with said first MOSFET switch so that first and second anodes of respective first and second parasitic diodes of respective first and second MOSFET switches are connected, said inductor, said first MOSFET switch and said second MOSFET switch being for use in the voltage-mode quasi-resonant converter.

11. An apparatus as claimed in claim 10, further comprising:

a capacitor connected in parallel with said first MOSFET switch and said second MOSFET switch to provide a resonance capability in conjunction with the inductor.

12. An apparatus as claimed in claim 10, wherein first and second parasitic capacitances of respective first and second MOSFET switches provide a resonance capability in conjunction with the inductor.

13. An apparatus as claimed in claim 10, wherein the voltage-mode quasi-resonant converter is for use with a load, further comprising:

a non-parasitic diode connected in series with said inductor for providing current generated by the voltage-mode quasi-resonant converter to the load in a selected direction.

* * * * *

UNITED STATES PATENT AND TRADEMARK OFFICE
CERTIFICATE OF CORRECTION

PATENT NO. : 5,067,066
DATED : November 19, 1991
INVENTOR(S) : CHIDA

It is certified that error appears in the above-identified patent and that said Letters Patent is hereby corrected as shown below:

Title Page, col. 2, line 6, change "58S70."

to --58-70.--.

Column 1, line 61, change "their" to to --the anodes of the--; and change

"opposite to each other" to

--connected together--.

Column 2, line 19, change "6E showing"

to --6E are waveforem diagrams showing--;

Column 2, line 25, change "FIG." to --FIGS.--.

UNITED STATES PATENT AND TRADEMARK OFFICE
CERTIFICATE OF CORRECTION

PATENT NO. : 5,067,066

DATED : November 19, 1991

INVENTOR(S) : Chida

It is certified that error appears in the above-identified patent and that said Letters Patent is hereby corrected as shown below:

Column 3, line 54, change "their" to --the anodes of the--, and change "opposite" to --connected--.

Signed and Sealed this

Fourth Day of May, 1993

*Attest:*

MICHAEL K. KIRK

*Attesting Officer*   Acting Commissioner of Patents and Trademarks